Jan. 17, 1956      H. F. KENNISON      2,730,783
APPARATUS FOR FORMING CONCRETE PIPES
AND OTHER HOLLOW BODIES

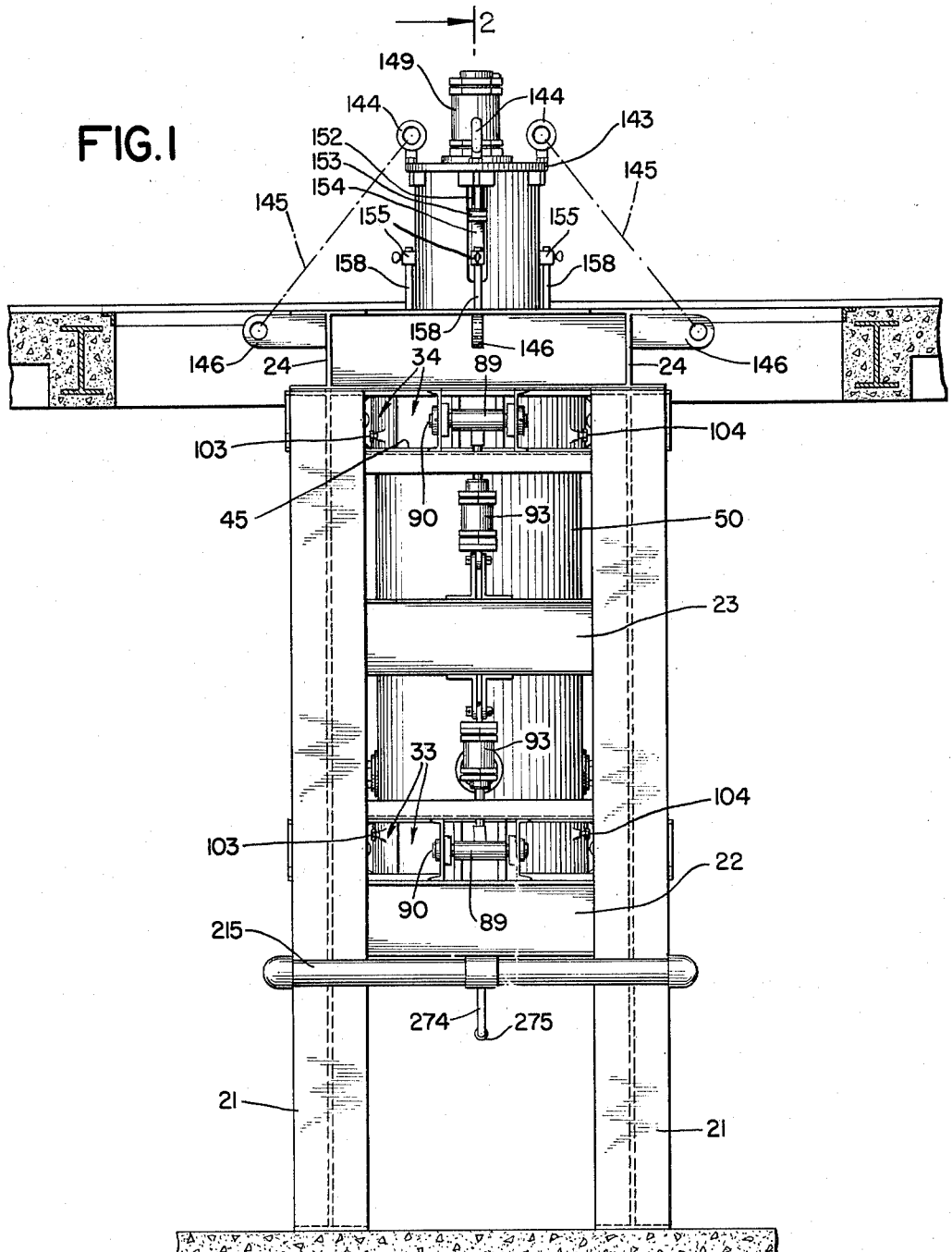

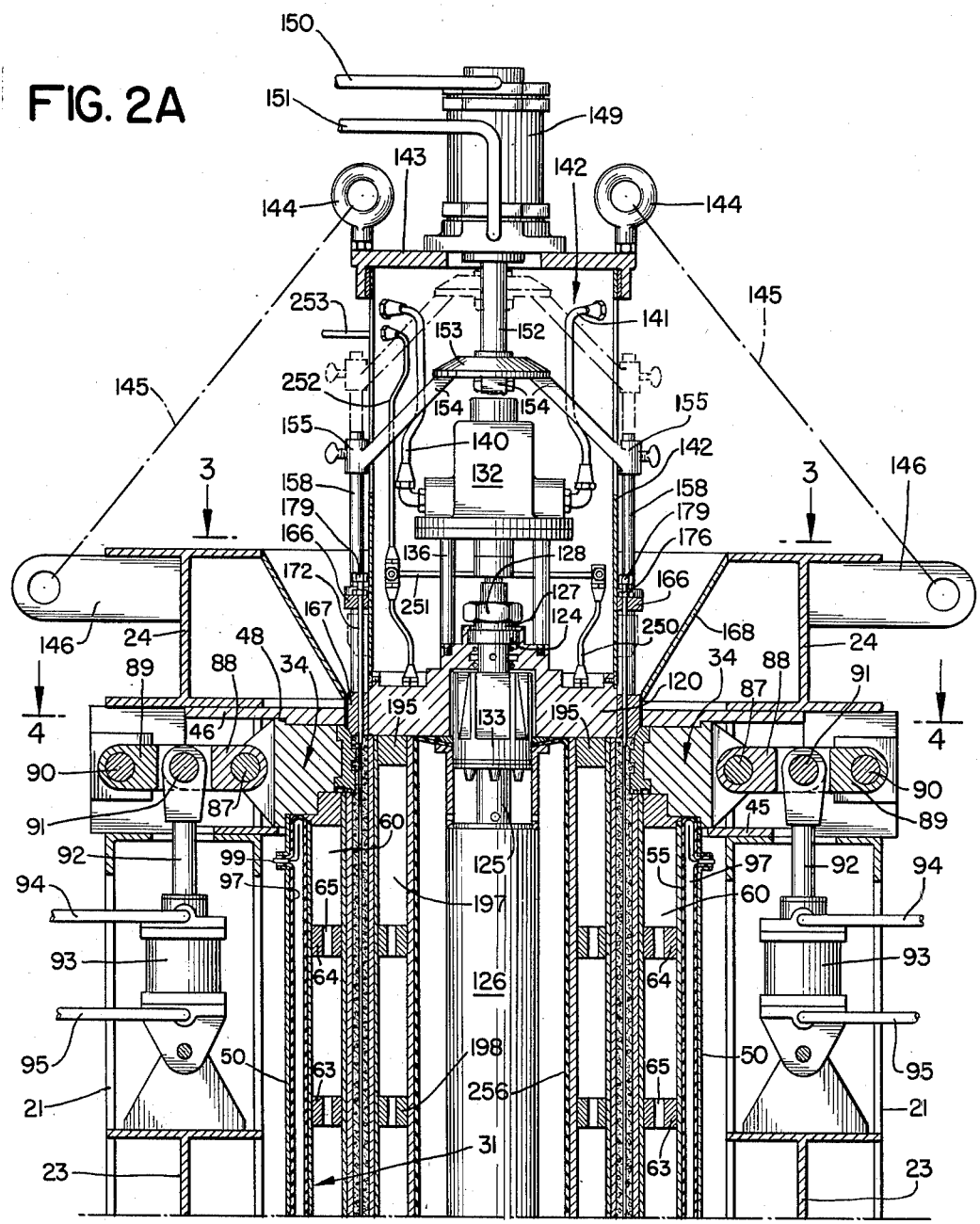

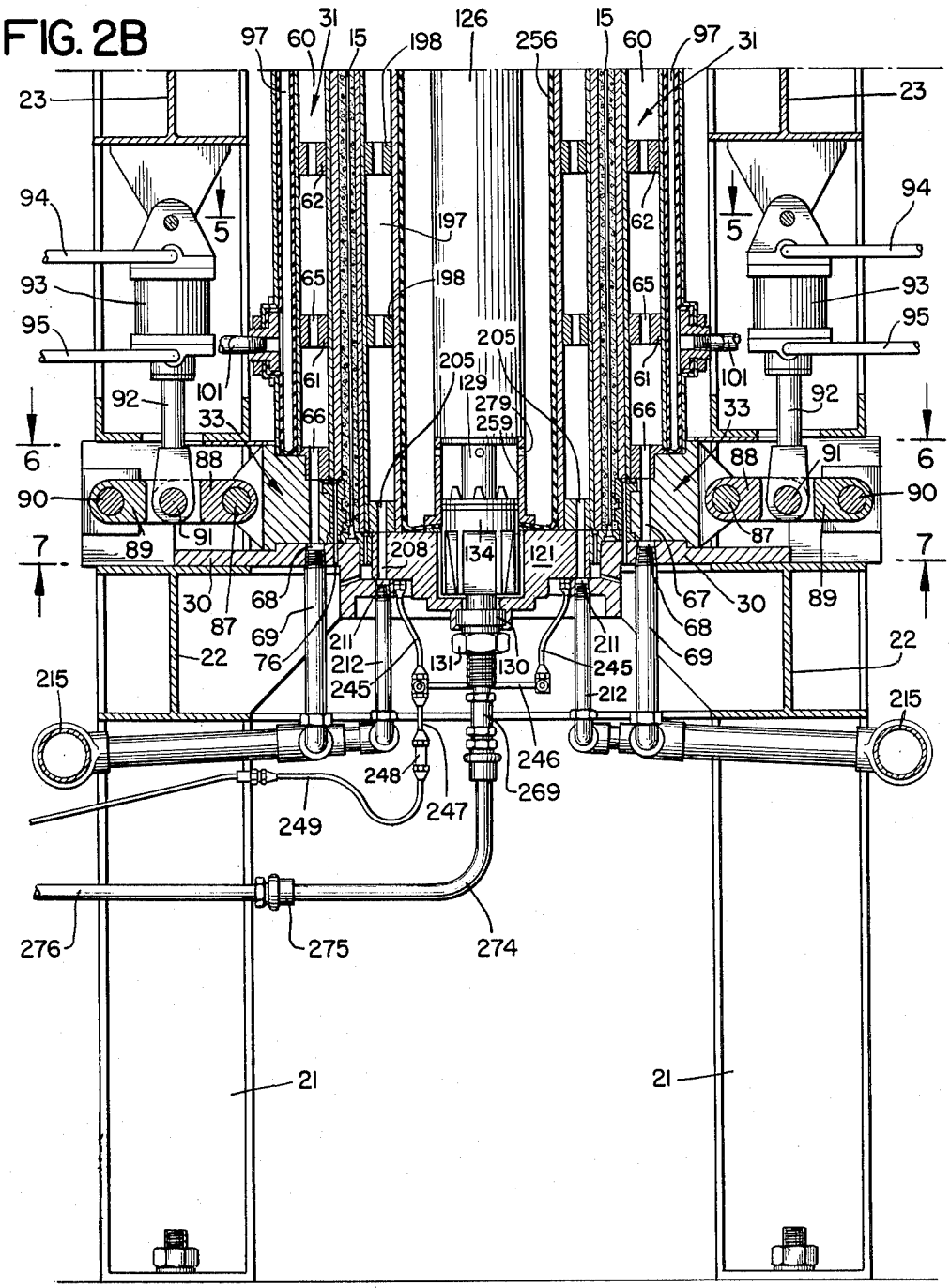

Filed Oct. 12, 1950      11 Sheets-Sheet 5

INVENTOR.
HUGH F. KENNISON
BY
Robert S. Dunham
ATTORNEY.

INVENTOR.
HUGH F. KENNISON
BY
Robert S. Dunham
ATTORNEY.

*INVENTOR.*
HUGH F. KENNISON
BY
Robert S. Dunham
ATTORNEY.

Jan. 17, 1956     H. F. KENNISON     2,730,783
APPARATUS FOR FORMING CONCRETE PIPES
AND OTHER HOLLOW BODIES

Filed Oct. 12, 1950     11 Sheets-Sheet 8

INVENTOR.
HUGH F. KENNISON
BY
Robert S. Dunham
ATTORNEY.

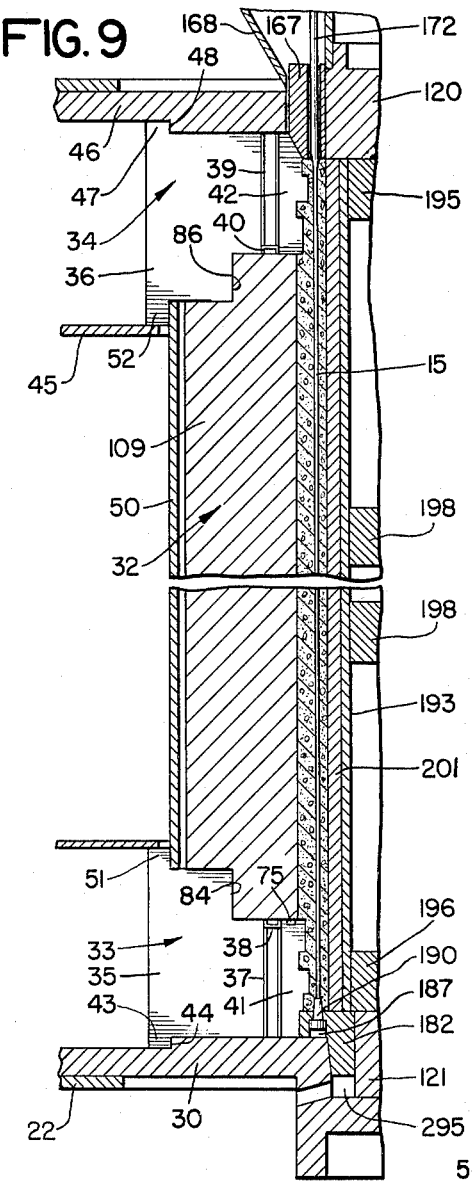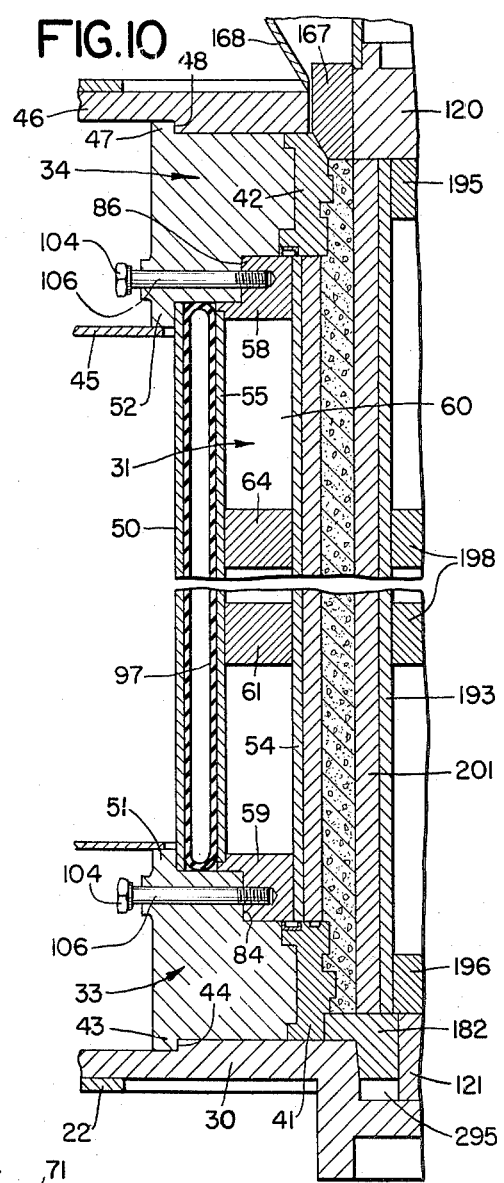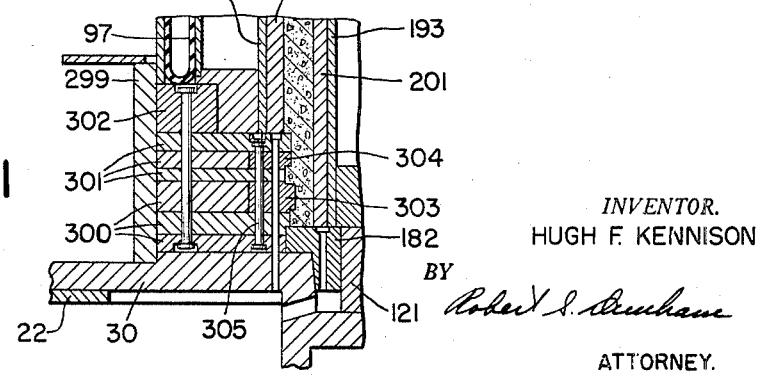

Jan. 17, 1956 H. F. KENNISON 2,730,783
APPARATUS FOR FORMING CONCRETE PIPES
AND OTHER HOLLOW BODIES
Filed Oct. 12, 1950 11 Sheets-Sheet 10

INVENTOR.
HUGH F. KENNISON
BY Robert S. Dunham
ATTORNEY.

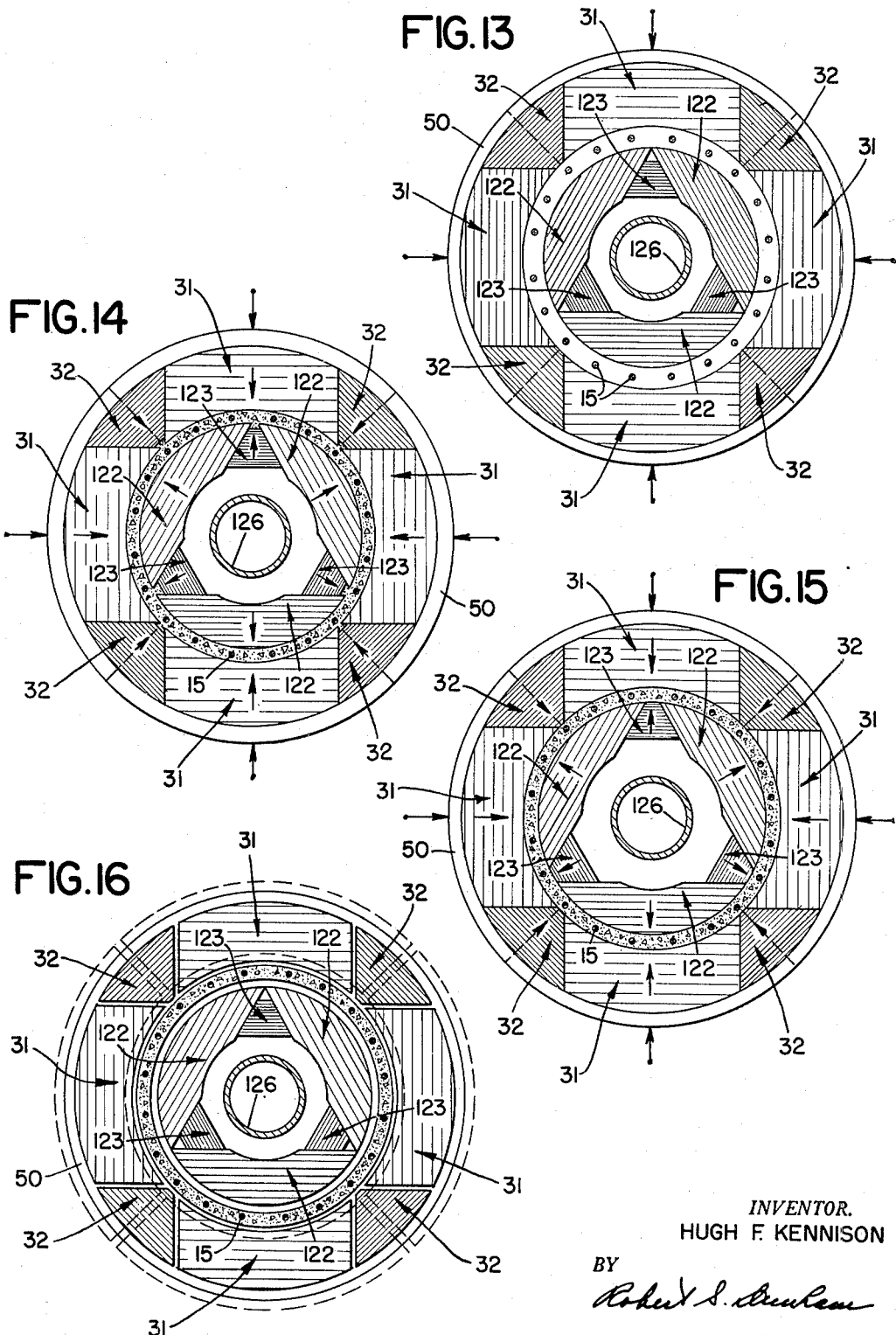

ately formed with finished dimensions. This is accomplished by dies which may have moulding surfaces shaped as desired for forming plain-walled surfaces or for forming grooves or other joint surfaces for the ends of pipes.
United States Patent Office 2,730,783
Patented Jan. 17, 1956

2,730,783

APPARATUS FOR FORMING CONCRETE PIPES AND OTHER HOLLOW BODIES

Hugh F. Kennison, Verona, N. J., assignor to Lock Joint Pipe Company, East Orange, N. J., a corporation of New Jersey Application October 12, 1950, Serial No. 189,693

26 Claims. (Cl. 25—30)

This invention relates to apparatus for forming concrete pipes and other hollow bodies.

Among the objects of the invention is to provide a reinforced concrete pipe in which the metallic reinforcing wires have been stressed before the concrete of the pipe has set and which is formed in such a manner as to provide a reinforced concrete wall of uniform thickness. The apparatus by which a pipe or other hollow concrete body is produced includes a mould having inner and outer deformable mould walls. Each mould wall includes juxtaposed segments which are movable radially to adjust the mould cavity and to compress and expand a tubular mass of flowable concrete. The positions and movements of the wall segments are so controlled as to assure symmetry of the inner and outer surfaces of the pipe being moulded.

The inner and outer mould walls are each constituted of major and minor segments of girder-like stiffness which provide inflexible shape-determining or moulding surfaces. The major segments have arcuate moulding surfaces and porous channels for permitting the extraction of excess water from the concrete and the retention of the cement particles. The minor segments complete the forms of the inner and outer mould walls and are located intermediate successive major segments. All of the major and minor segments are positively constrained against movement to limit the spacing of the walls of the mould during the pouring of the concrete, and the spacing of the mould walls is accurately determined. The apparatus controls the exact positions of the inner and outer mould segments and provisions are made for making these positions known to the operator so that the wall thickness of the moulded hollow body can be accurately determined.

The invention also enables the ends of a moulded body to be accurately formed with finished dimensions. This is accomplished by dies which may have moulding surfaces shaped as desired for forming plain-walled surfaces or for forming grooves or other joint surfaces for the ends of pipes.

It has previously been proposed to form a reinforced hollow body of concrete by expanding the wall of a compacted tubular body and to thereby tension the circumferential reinforcement within the wall before the concrete has hardened, but in moulds by which this has been done it has not been possible to assure the production of a tubular body having a wall of uniform thickness throughout its length, and in no previous apparatus has it been possible uniformly to mould the ends of tubular bodies or to provide pipes with finished joint-forming ends. The apparatus of the present invention is capable of producing high pressure pipe of the type described having uniform wall and strength characteristics and ends with joint-forming shapes finished in the same operation by which the entire pipe is moulded.

The apparatus includes an inner mould assembly which is separable from the outer mould and to which longitudinal reinforcing wires and circumferential wire reinforcing may be attached. The inner mould assembly is lowered into the outer mould and tied in place. The mould walls are then adjusted to positions to provide the size of mould cavity desired. After a predetermined amount of concrete is poured into the mould cavity between the inner and outer mould walls, and the supply lines are connected, the inner and outer mould walls are moved radially for carrying out the various treatments which are required for moulding and completing the manufacture of the pipe. The construction and the movements of the inner and outer mould walls incident to the treatments will be explained in greater detail hereinafter. Following the completion of the moulding operation, the breaking of the bonds between the moulding segments and the pipe and the disconnection of the pressure supply lines, the inner mould assembly, together with the moulded pipe, is withdrawn from the outer mould. The inner mould assembly and the moulded pipe are then supported to one side, and the inner mould is thereafter separated from the pipe.

The construction by which the foregoing operations may be carried out results in a considerable saving of time in the manufacture of concrete pipe containing tensioned longitudinal reinforcing and tensioned circumferential reinforcing. The removal of the inner mould assembly from the moulded pipe and the cleaning and re-wiring of the inner mould assembly are performed at a station displaced from the outside mould and the principal mould-operating devices. The exterior of the inner mould assembly is made readily accessible to visual inspection and the placing of the wire reinforcing can be easily supervised. The stripping of the mould is very quickly accomplished. The outer mould can be cleaned and prepared for re-use while the inner mould assembly is being removed from the pipe and the inner mould assembly is being cleaned and rewired for the moulding of another pipe.

The movements of the inner and outer mould segments are hydraulically controlled with special refinements for initially locating the mould segments and for controlling the amounts of pressure exerted on the concrete to induce a permanent tension in the circumferential reinforcement. Pre-stressed hollow concrete bodies having a variety of uses, such as pipes, piles, columns, containers, and other tubular constructions, may be made by an apparatus employing the present invention.

Other objects of the invention will be pointed out in the following description and claims and illustrated in the accompanying drawings which disclose by way of example the principle of the invention and the best modes which have been contemplated for applying that principle.

In the drawings:

Fig. 1 is an elevational view of the exterior of the assembled mould;

Figs. 2A and 2B are vertical sections showing interior constructions;

Fig. 9 is a vertical section through an outer minor segment on line 9—9 of Fig. 5;

Fig. 10 is a vertical section through an outer major segment on line 10—10 of Fig. 4;

Fig. 11 is a view similar to Fig. 8, showing a modified form of construction for the lower end of the mould;

Figure 17:
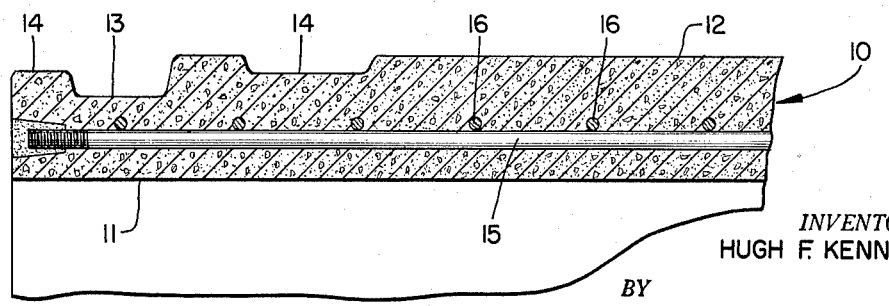
Figure 18:
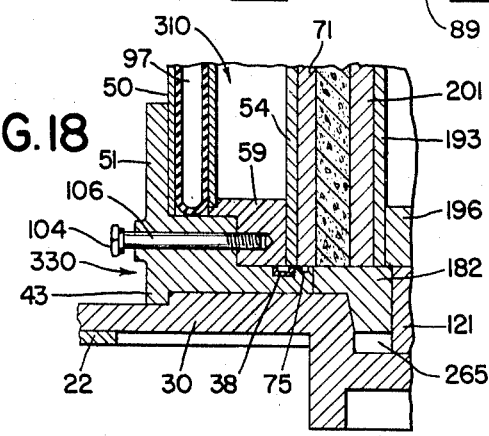

Figs. 13, 14, 15 and 16 illustrate diagrammatically different moulding stages; Fig. 13 shows the positions of the mould segments during pouring of the concrete; Fig. 14 shows the positions of the mould segments during dehydrating the concrete; Fig. 15 shows the positions of the mould segments during prestressing and curing of the concrete; and Fig. 16 shows the positions of the mould segments broken away from the moulded concrete body;

Fig. 17 is a partial sectional view of a product produced by the apparatus illustrated in the accompanying drawings; and Fig. 18 is a view illustrating an outer major mould segment constructed for moulding a plain end.

A finished product of the apparatus includes a tubular body 10 of concrete having concentric and parallel inner and outer surfaces which are formed to true dimensions. The concrete of the wall is highly compacted and is very hard and dense. One form of the product is illustrated in Fig. 17 in the form of a prestressed pipe. The ends of the pipe may be finished with surfaces coextensive or substantially coextensive with the outer surface 12, or the outer surface may be provided with a groove 13 for accommodating a sealing gasket and with other surfaces of different diameters such as shown at 14. Howsoever the ends of the pipe are finished, they are shaped in final form and do not require finishing or machining after the moulding operation.

The pipe wall contains longitudinal reinforcing wires 15 which are prestressed and held in tension during the forming and curing of the concrete. These longitudinal wires are spaced about the circumference of the pipe. The circumferential reinforcing wires 16 are tensioned during the moulding of the pipe. The longitudinal and circumferential wires are preferably constituted of high tensile steel having a high elastic limit.

During the moulding operation the excess water is removed from the concrete by moving the mould walls to compact the concrete and the inner and outer mould walls are then circumferentially expanded under pressure, with the result that the concrete is highly compacted and the circumferential reinforcing wires 16 are stressed and expanded outwardly from their original positions in the mould by the concrete within the circumference of the wires. The concrete is cured with the circumferences defined by the mould walls enlarged.

The amount of compression in the concrete and the amount of tension in the circumferential reinforcing wires is controlled by the outward movement or expansion of the mould walls. The expansion of the mould walls is attained by hydraulic pressure. The circumferential wires may be stressed to an amount up to the maximum elastic limit of the steel in the wires. A pipe formed with the present apparatus is capable of withstanding working loads many times greater than the working loads of reinforced concrete pipes which are wrapped with tensioned wire after the concrete has hardened. Any fissures which may develop in the concrete during testing immediately close and become indiscernible when the testing pressure is relieved.

The mould is supported by four corner columns 21 (Figs. 1, 2A and 2B), which are connected together at three levels by cross-beams 22, 23 and 24 at the different levels to form an open box-like frame. The frame supports the mould and the various devices by which the mould is controlled during the treatment of the concrete. The outer mould and the inner mould assembly are supported by a lower base plate 30 which is supported on the lower tier of cross-beams 22.

The outer mould wall (Fig. 5) includes four radially movable major segments 31, which are separated by radially movable minor segments 32. The lower ends of these outer mould segments rests upon dies 33 (Figs. 2B and 12), which mould the outer surface of the hollow body at its lower end. The dies are supported on the base plate 30 and are adapted to be moved radially between guiding surfaces. The dies 34 (Fig. 2A), located at the upper ends of the outer mould segments, likewise are adapted to be moved radially between horizontal guides. The dies 33 and 34 are shown as having profiles for moulding grooves and rings on the outside of a pipe but either one set or the other or both may be provided with plain cylindrical profiles, as desired.

Figure 4:
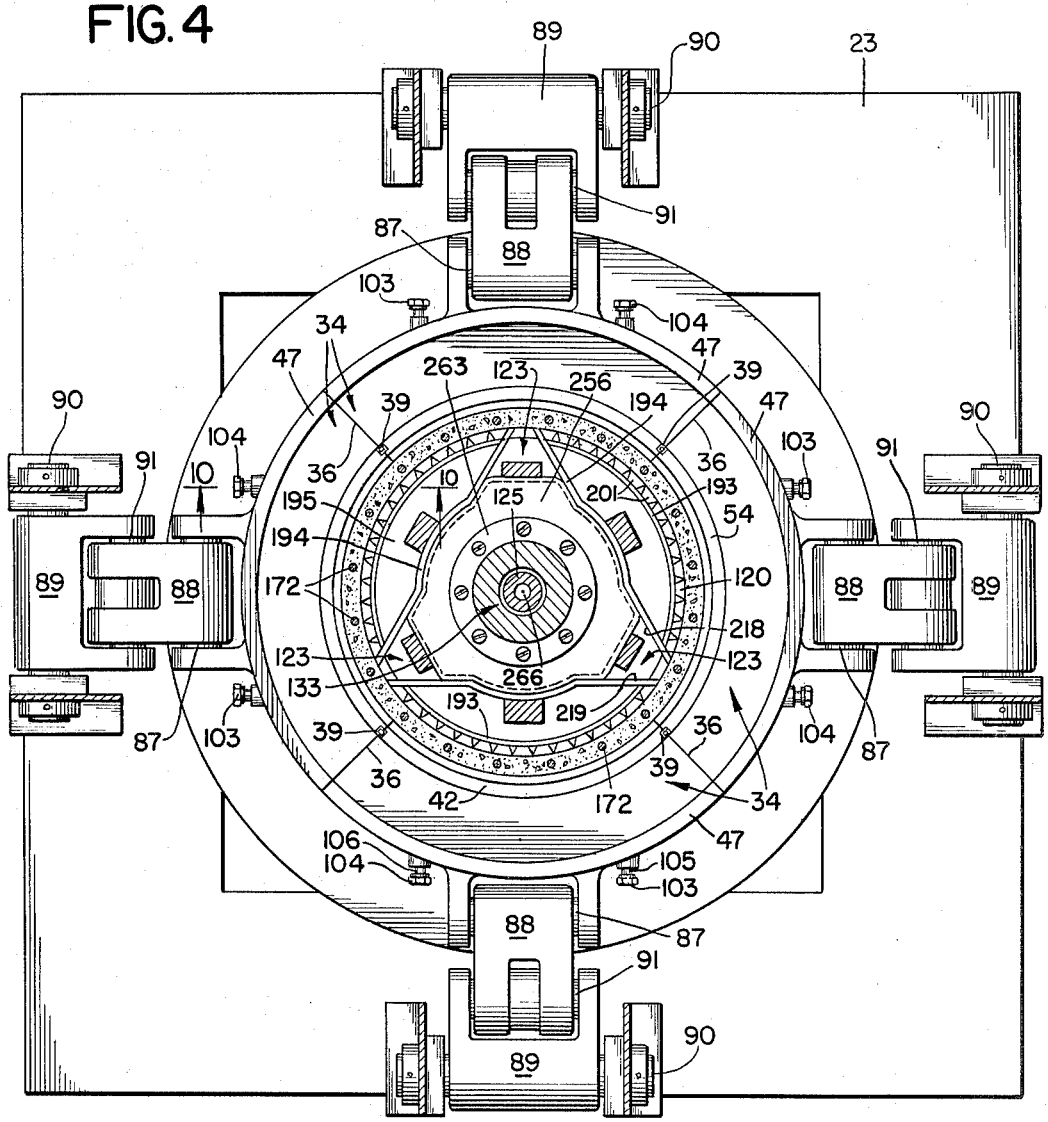
Fig. 4 is a horizontal section on line 4—4 of Fig. 2A.

The lower and upper end dies 33 and 34 are each constituted of individual segments in the form of quadrants. Adjacent radial surfaces 35 at the ends of each of the lower die segments, Fig. 6, and adjacent radial surfaces 36 at the ends of each of the upper die segments, Fig. 4, bear closely upon one another when the die segments are in their innermost positions, as when a pipe is being moulded. The lower die segments have vertical grooves 37 (Fig. 9) in their radial surfaces 35 and circular grooves 38 in their upper surfaces for receiving gaskets (Fig. 6) whereby to seal against the passage of water from within the mould cavity. Similar vertical grooves 39 and circular grooves 40 are provided for containing gaskets at the side and lower surfaces of the upper die segments 34, Fig. 9.

Each of the die segments 33 and 34 may be made of a solid piece of metal or assembled from a number of pieces. The die segments are similar and are provided with moulding surfaces finished in any shape desired for forming the exterior of the ends of the body to be moulded. If it is desired to provide a pipe with a gasket-receiving groove, such as shown at 13, Fig. 17, the forming surfaces of the dies are provided with ribs for moulding the groove. Other grooves may be formed in the pipe by suitably shaping the dies, or the moulding surfaces of the dies may be cylindrical or conical. Whatever shapes are desired for the outside of the ends of a moulded body, the surface moulding portion of the die may be cut from an insert 41 for each quadrant of the lower dies 33, and from an insert 42 for each quadrant of the upper dies 34, Fig. 10. These inserts are preferably formed of porous metal for permitting the removal of excess water from the concrete located opposite the dies.

The lower end dies 33 are slidable radially upon the fixed base plate 30. Each of the lower dies has a flange 43 engageable with a shoulder 44 on the base plate for limiting the inward movement of the dies, Figs. 9 and 10. All of the upper end dies 34 are slidable radially between the plate 45 and the top plate 46, and each of the upper dies is provided with a flange 47 adapted to contact a shoulder 48 on the top plate 46 for limiting the inward movement of the upper dies. Between the lower end dies and the upper end dies there is a hollow non-deformable cylinder or shell 50 of heavy metal, and flanges 51 and 52 on the lower and upper dies, respectively, serve to maintain the shell 50 concentric with the axis of the mould during a moulding operation, that is, when the end dies have been positioned to their innermost locations, as illustrated in Figs. 9 and 10.

Figure 5:
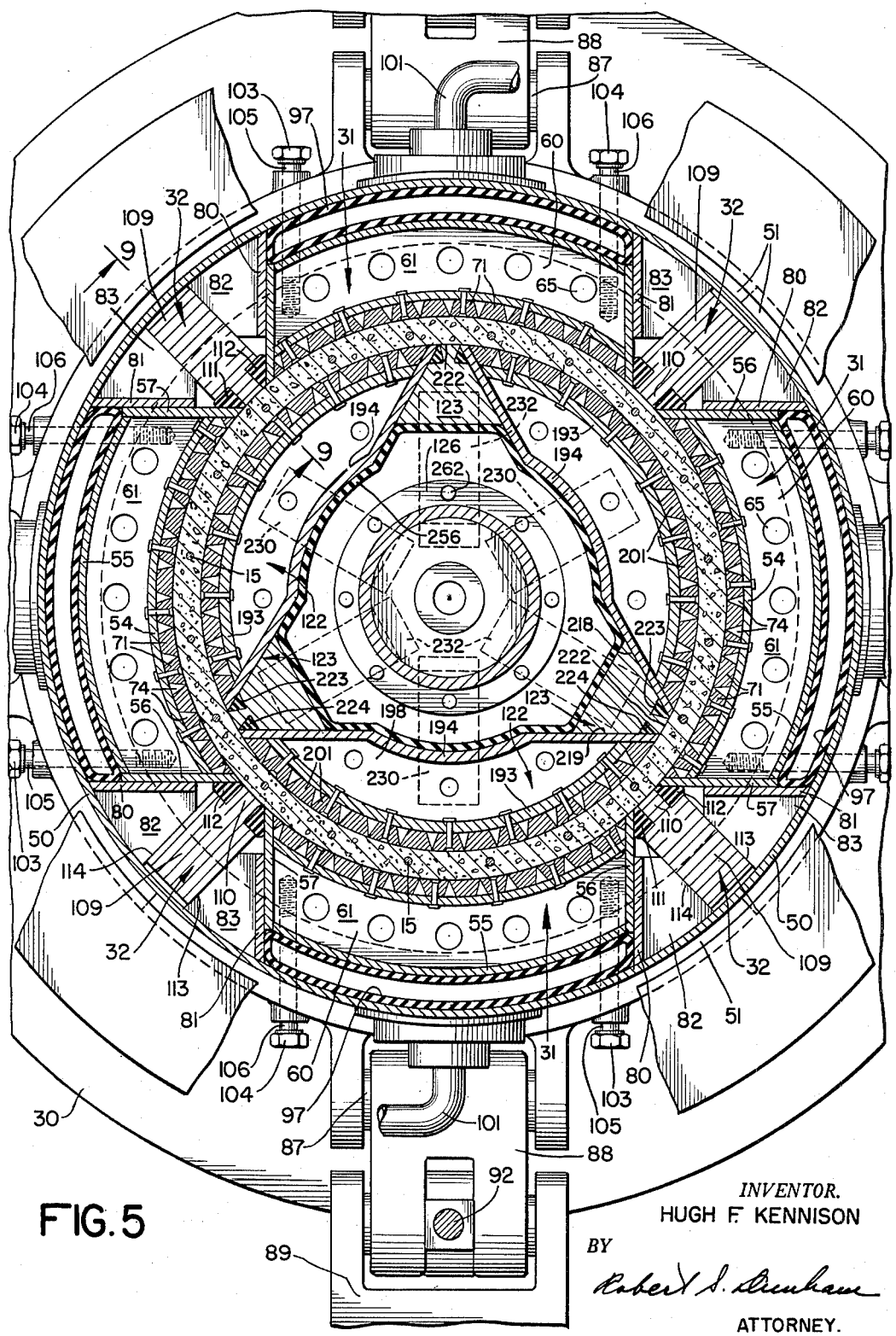
Fig. 5 is a horizontal section on line 5—5 of Fig. 2B.

The major and minor segments of the deformable outer mould have inner moulding surfaces which are curved or formed together to mould the exterior of a pipe or other hollow body. There are four outer major segments 31 equally spaced about the mould cavity, each being spaced from another by an outer minor segment 32, as best seen in Fig. 5. All of the segments are movable towards and away from the axis of the mould. The major segments constitute the principal surface moulding elements and the minor segments serve as pressure-retaining elements between the major segments. Together they provide an outer mould wall for the moulded body between the portions thereof moulded by the upper and lower end dies.

Each of the outer major segments 31 comprises a hollow built-up girder-like member forming a cored wall member extending between the upper and lower end dies and resting upon the lower end dies, as best seen in Figs.

Figure 7:
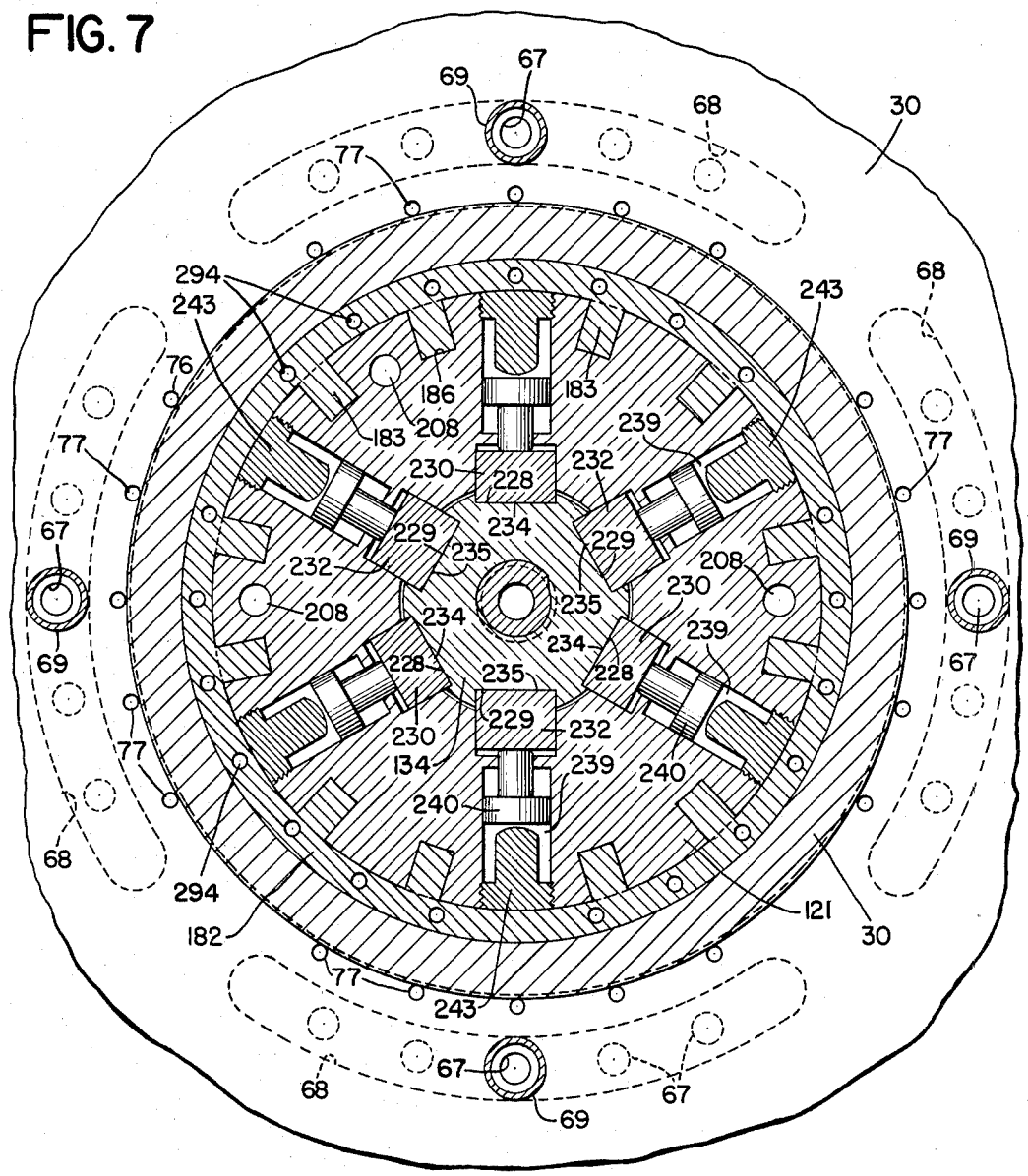
Fig. 7 is a horizontal section on line 7—7 of Fig. 2B, looking upward.

2A, 2B, 10 and 12. Each major segment includes: curved parallel inner and outer walls 54 and 55, respectively, connected together at their longitudinal edges by flat parallel walls 56 and 57 (Fig. 5), and at their upper and lower ends by walls or blocks 58 and 59, respectively, all of which are welded together to form a sealed enclosure 60 within the segment for receiving steam. A number of horizontal separators 61, 62, 63 and 64 are provided between the curved walls 54 and 55 for buttressing the walls and for contributing to the rigidity of the entire mould segment. Each of the wall separators is provided with a plurality of holes 65 for permitting the distribution of steam throughout the entire enclosed chamber 60. The lower wall 59 is likewise provided with a plurality of holes 66 (Figs. 2B and 12) which register with a plurality of holes 67 through the lower dies 33 which lead to a circular channel 68 in the upper surface of the base plate 30. A steam supply pipe 69, is tapped in the base plate 30 and in communication with the circular channel 68. There is one circular channel 68 and one steam supply pipe 69, Fig. 7, for each of the major outside mould segments 31.

The inner wall 54 of each outer major mould segment carries a filtering device formed from a plurality of parallel steel bars 71, Fig. 5, which provide the moulding surface of the outer major moulding segments. These bars have bevelled side edges which provide V-shaped channels 74 between adjacent pairs of bars and the wall 54. Alternate bars of the several bars 71 are welded to the wall 54 and intermediate bars of the several bars 71 are riveted to the wall 54. The longitudinal bevelled edges of adjacent bars just touch each other and the V-shaped channels 74 extend for the full length of the mould segment. The channels 74 are filled with sand or other material suitable for filtering the water passing into the channels from the exterior surface of the concrete.

Figure 6:
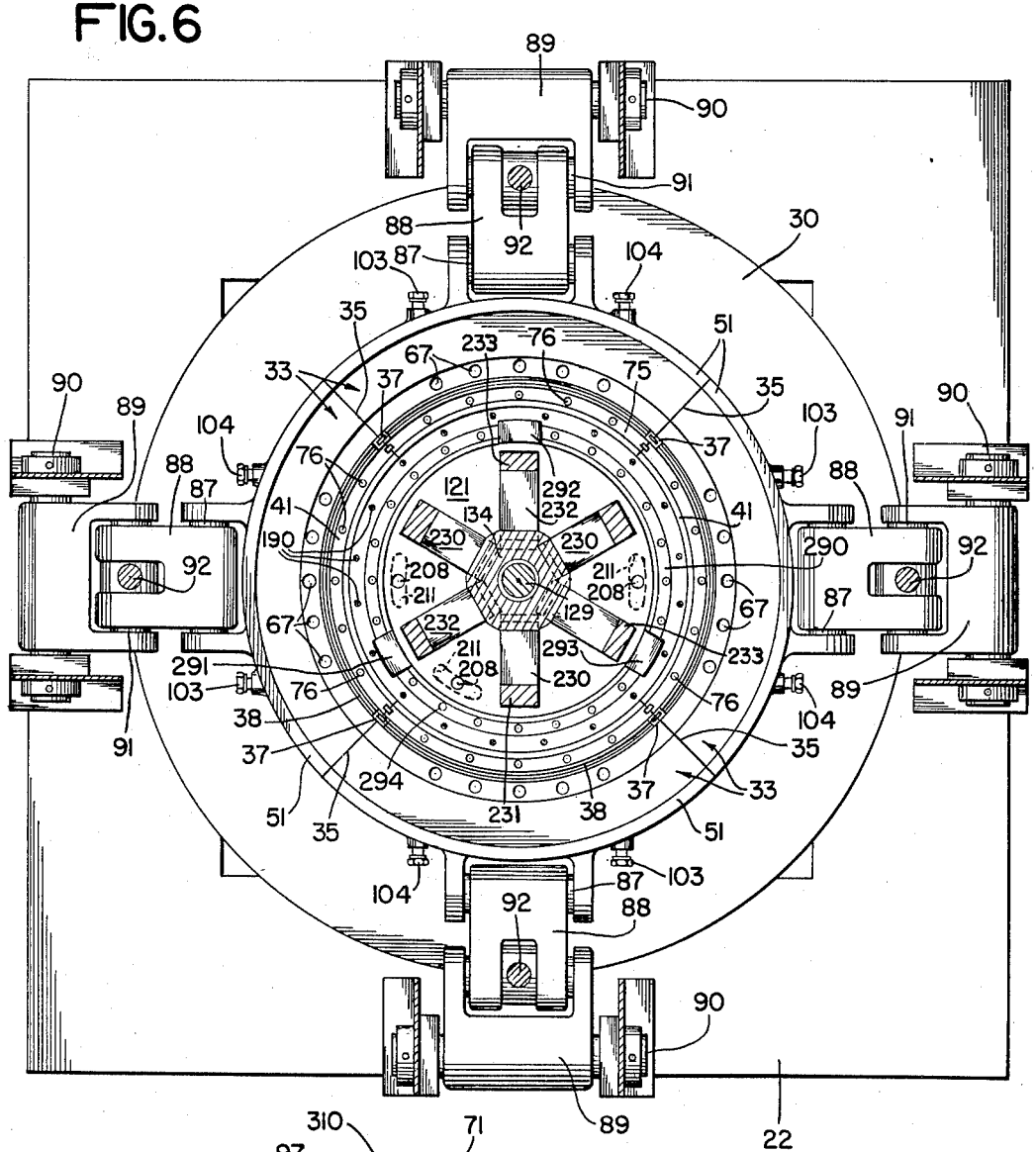
Fig. 6 is a horizontal section on line 6—6 of Fig. 2B, with the inner and outer moulds removed.
Figure 12:
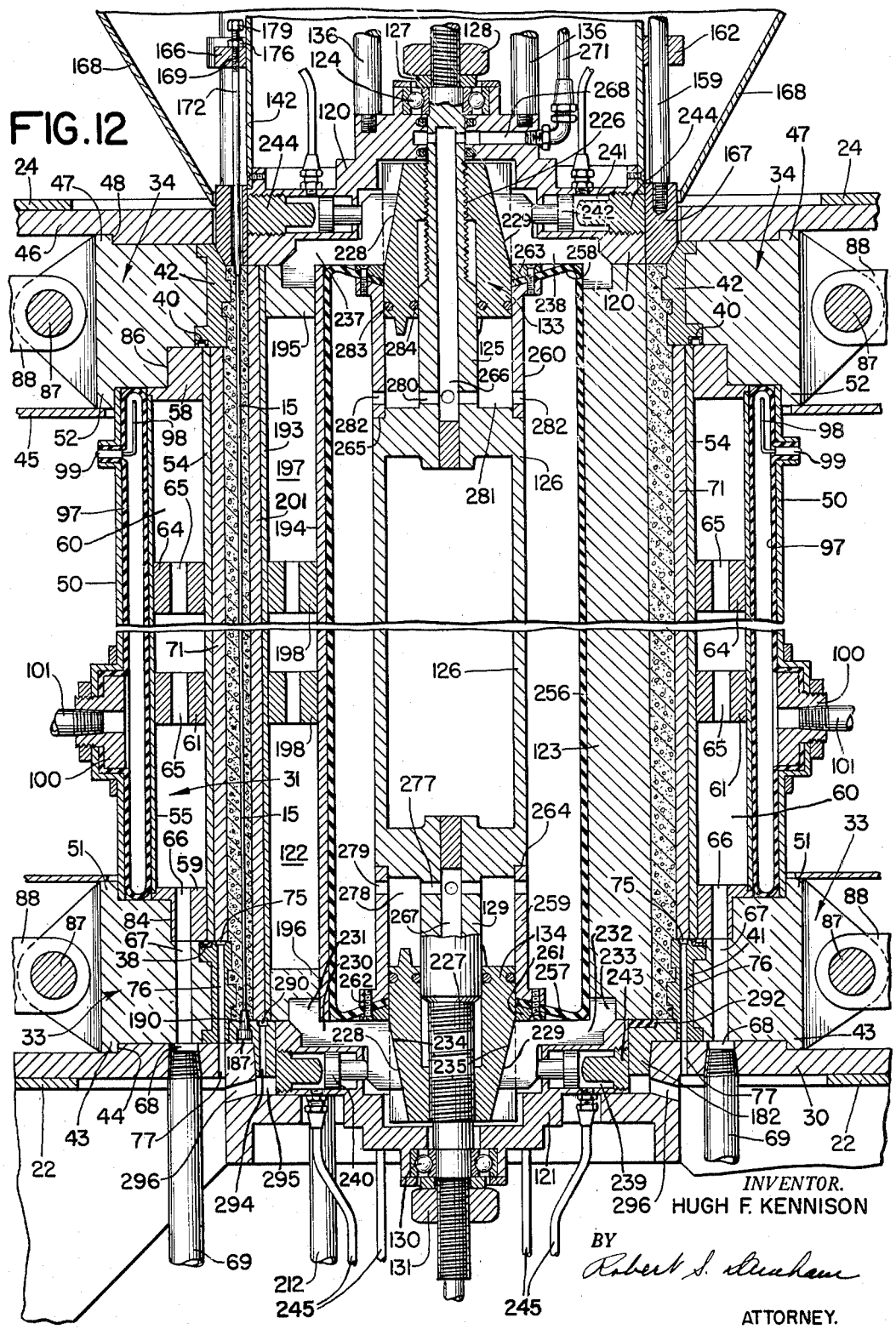
Fig. 12 is a vertical section through the mould on line 12—12 of Fig. 3.

Water travelling downwardly through the channels 74 of the filtering device is received in a circular recess 75 in the upper surface of the lower dies 33 and is conducted through the lower dies through holes 76 to a discharge port 77 in the base ring 30, Figs. 6 and 12. There are a plurality of passages 76 in each of the quadrants of the lower dies 33, as illustrated in Fig. 6. The water exhausted through the port 77 is collected for measuring purposes.

As shown in Fig. 5, the walls 56 and 57 of each of the outer major segments are parallel and slidingly contact the parallel guide plates 80 and 81, respectively, which are fastened to the outer shell 50 and to the brackets 82 and 83, whereby to limit the expanding and contracting motion of the outer major segment in a lineal direction at right angles to the axis of the mould. The lower end of each of the outer major and minor segments is supported on one of the segments or quadrants of the lower dies 33 and is adapted to be moved inwardly and outwardly as the upper and lower dies are moved, as well as independently of the dies as will be explained hereinafter.

For moving the outer segments 31 and 32 inwardly under the control of the upper and lower dies (Figs. 6, 10 and 12), each of the lower dies is provided with a shoulder 84 which engages an exterior surface of the lower wall 59 of a segment 31 and the lower ends of adjacent segments 32. The upper dies are likewise provided with a shoulder 86 for engaging an exterior surface of the upper wall 58 of the segment 31 and the upper ends of adjacent segments 32. The upper and lower dies are actuated simultaneously and thereby cause like movements of all of the outer major and minor mould segments and also hold all of the outer mould segments parallel to each other for moulding purposes.

Each of the die segments of the lower and upper sets of end dies 33 and 34, respectively, is operated by a toggle which is hydraulically controlled (Figs. 2A and 2B). Each toggle includes a pair of links 88 and 89, respectively, pivotally connected at their ends to the pin 87 carried by a die quadrant and to a fixed pin 90. The links are pivotally connected together by a pin 91 which is carried by a piston 92 of a hydraulic cylinder 93. There is an hydraulic cylinder and connecting pressure lines 94 and 95, and similar toggle linkages for operating each of the lower and upper die segments 33 and 34, respectively.

For moving the outer major mould segments 31 inwardly beyond the positions in which they are positionable by the end dies, a hydraulically inflatable diaphragm or bag 97 is located between the shell 50 and the outer wall 55 of each mould segment, as illustrated in Figs. 2A, 2B, 10 and 12. The side edges of the bag are confined by the vertical guide plates 80 and 81, Fig. 5. As best shown in Fig. 12, each bag is provided with a venting tube 98, a check valve 99, and a nipple 100 to which a pressure supply tube 101 is connected. The distensible diaphragms or bags 97 may be made of any suitable extensible rubber or rubber-like material, such as either a natural or synthetic rubber preferably compounded for resistance to heat. Compounds similar to those well-known to the rubber compounding art, which have been used in the past for tire-curing water bags are suitable for making the extensible diaphragms of the present apparatus.

When the manufacture of a pipe is completed, the end dies 33 and 34 are broken away from the pipe by collapsing the toggle linkages 88, 89, by pressure applied to the cylinders 93, and as the end dies move outwardly, they contact with projections (Figs. 5 and 10) at the upper and lower ends of the outer major mould segments and force the segments outwardly. These projections are in the form of heads 103 and 104 of the screws 105 and 106, respectively, Fig. 5, which are secured in pairs in the upper and lower walls 58 and 59 of each of the outer major mould segments and extend freely through holes in the dies. When the heads 103 and 104 of the screws are engaged by the moving segments of the end dies, the outer major mould segments are forcibly broken away from the outer wall of the concrete body.

There are four outer minor mould segments 32 (Figs. 5 and 9), one between adjacent outer major segments 31. These minor segments serve as moulding and sealing or pressure-retaining members between the outer major mould segments. Each of the outer minor mould segments 32 comprises a solid bar 109 and a rib 110 whose width is equal to the space between the side walls 56 and 57 of adjacent outer major mould segments, when the outer mould segments are in positions in which the concrete body is fully expanded, as illustrated in Fig. 5. The rib 110 provides a relatively narrow moulding surface as compared with the breadth of the moulding surface of an outer major mould segment 31. The sides of the rib 110 and the adjacent portions of the bar 109 and the walls 56 and 57 of the outer major mould segments provide wedge-shaped recesses for receiving rubber gaskets 111 and 112 at either side of the rib 110. The gaskets serve to prevent leakage of liquid between the longitudinal edges of outer major and minor mould segments.

The opposite surfaces 113 and 114 of the bar 109 are parallel and are guided by parallel edges of the brackets 82 and 83, which limit the movement of the outer minor segment to a lineal direction towards and away from the center of the mould. There are several of these brackets at either side of each minor segment and spaced from each other throughout the length of the segment. The innermost positions of the outer minor segments 32 are controlled by the upper and lower dies which have shoulders 84 and 86, Fig. 9, for engaging the ends of the outer minor segments. The ribs 110 of the outer minor mould segments 32 mould only a proportionately small portion of the circumference of the concrete body and they are free to break away from the surface of the concrete when the pressure of the shoulders 84 and 86 is removed from the minor mould segments as the outer major mould segments are retracted by the movement of the upper and lower end dies.

The inner mould assembly

The inner mould assembly is removable from the outer mould and the operating parts hereinabove described. Referring particularly to Figs. 2A, 2B and 12, the inner mould assembly includes an upper end member or control ring 120 and a lower end member or control ring 121 which are located opposite the ends of inner major mould segments 122 and inner minor mould segments 123. These inner major and minor mould segments constitute the inner deformable wall of the mould. The inner major and minor mould segments 122 and 123 are alternately arranged circumferentially about the center of the mould (Fig. 5), and are adapted to be moved inwardly and outwardly for changing the inner diameter of the mould cavity.

The upper control ring 120 carries a bearing 124 for rotatably supporting a shaft 125 which is an extension of a larger shaft 126. A washer 127 engages the inner race of the bearing and is held in fixed relation to the shaft by a nut 128. A shaft 129 extends from the lower end of the shaft 126 and is rotatably supported in a bearing 130 in the lower control ring 121. The inner race of the bearing 130 is held in place with respect to the shaft by a washer and a nut 131. The nut 131 also serves to prevent the control ring 121 from slipping off the end of the shaft 129 when the inner mould assembly is outside of the outer mould. The shafts 125, 126 and 129 constitute a rotatable column which may be made from a rod, or from several shafts assembled together to operate as one piece with the shaft 126 constituting a hollow cylinder sealed at both ends. The enlarged diameter of the shaft 126 reduces the volume of fluid required to fill the space surrounding the shaft.

The central column (shaft 125, 126 and 129) is controlled and driven by a torque motor 132 by which the column is rotatable in reverse directions or held in any desired position. The shafts 125 and 129 are threaded to engage cams 133, 134, respectively, for moving the cams axially of the shafts to locate the positions of the upper and lower ends of the inner mould segments 122 and 123, as will be explained more fully hereinafter.

The torque motor 132 is rigidly supported by four posts 136 which extend upwardly from the upper control ring 120. The torque motor is hydraulically controlled through conduits 140 and 141 which have connections extending through a sleeve 142. The sleeve 142 is supported upon the upper control ring 120 and is fastened thereto. The sleeve 142 has openings for permitting the passage of members therethrough and for access to its interior for servicing purposes. A header in the form of a flanged plate 143 is attached to the upper end of the sleeve 142. Several eyebolts like the eyebolts 144 (Figs. 1 and 2A) are secured to the plate 143. For lifting the inner mould assembly from the outer mould, hooks are attached to the eyebolts, and when the inner mould assembly is associated with the outer mould, the inner mould assembly securely fastened down by lines 145 attached to the several eyebolts 144 and to corresponding brackets 146, which are rigidly fastened to the cross-beams 24.

Figure 3:
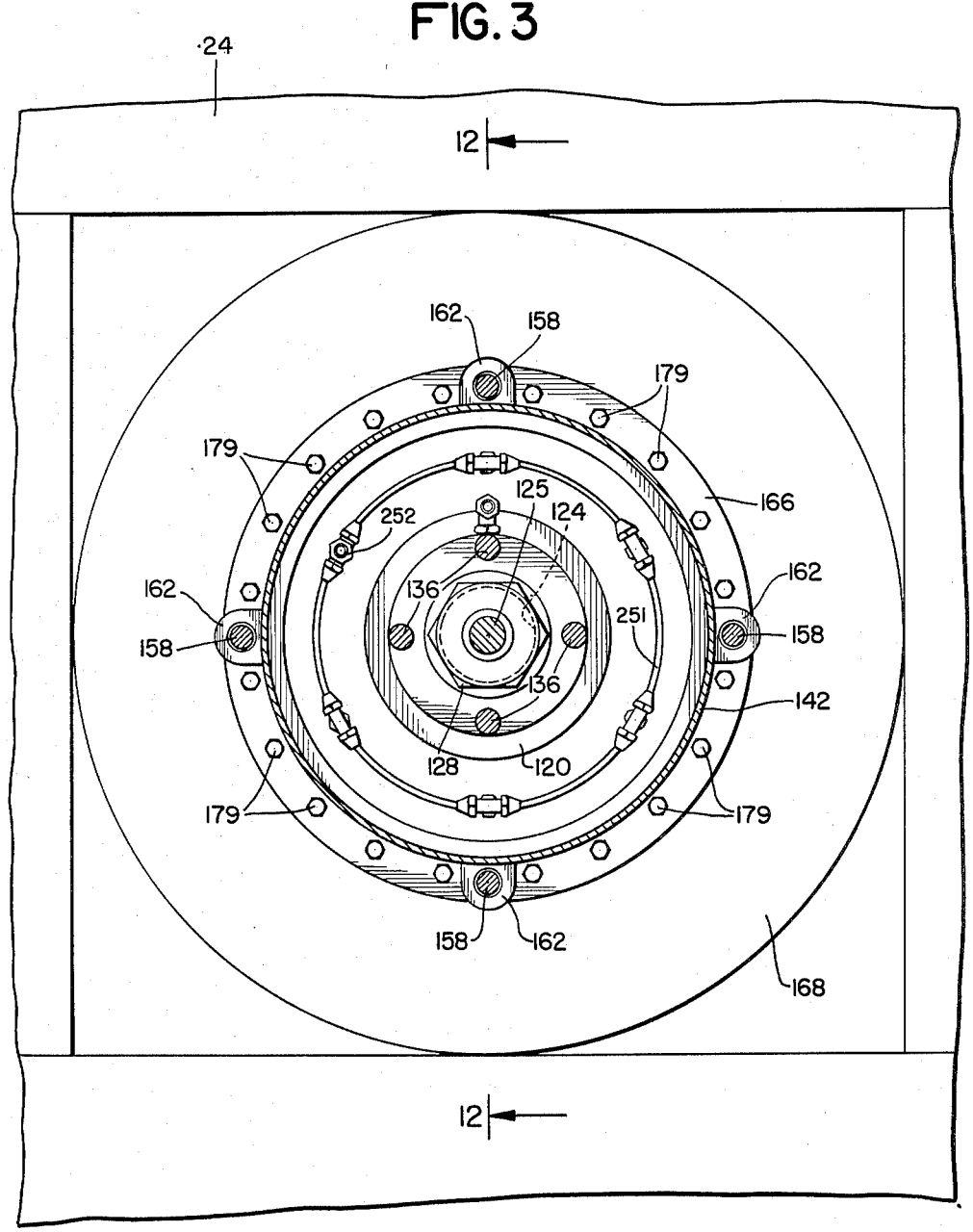
Fig. 3 is a horizontal view on line 3—3 of Fig. 2A.

An hydraulically pressurized cylinder 149 containing a piston (not shown) is mounted on the plate 143, Fig. 2A. The piston is positioned and its movement is controlled by fluid pressure applied to its opposite sides through pipe lines 150 and 151. The piston is attached to the piston rod 152, which is connected to a spider 153 carrying four arms 154, whose ends 155 are attached to rods 158. The rods 158 pass freely through bosses 162 (Fig. 3) which constitute parts of a prestressing ring 166 which is fastened to the sleeve 142 (Figs. 2A and 12). Attached to the lower ends of the rods 158 is a tamping ring 167, which is employed for tamping the concrete into the upper end of the mould cavity and for closing the upper end of the mould cavity. The tamping ring is reciprocated by fluid pressure in the cylinder 149 and is employed to pack concrete which is deposited in and around the funnel-like pouring hopper 168. When the mould cavity is fully loaded, the tamping ring is held down by the pressurized piston and cylinder 149 in sealing relationship with the inner edges of the upper end dies 34 which are provided by the moulding inserts 42.

The upper ends of the longitudinal reinforcing wires 15 are suspended from the prestressing ring 166. The prestressing ring 166 has a plurality of holes 169 spaced equally around the ring and in such number as to correspond with the number of longitudinal reinforcing wires 15 which are desired to be used in the pipe. These holes individually accommodate the rods 172, whose upper ends are threaded to engage the nuts 176 and terminate in bolt heads 179 by which the rods may be rotated to connect and disconnect them from the wires 15. The nuts 176 seat on the prestressing ring 166 and are rotated to apply tension to the rods and the wires. The several rods 172 pass freely through the tamping ring 167 and extend therebelow into the mould cavity. The lower ends of the rods are tapped for receiving and securing the upper ends of the longitudinal reinforcing wires 15.

Figure 8:
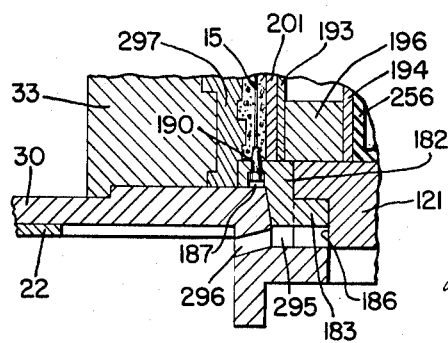
Fig. 8 is an enlarged detail of the lower end of the mould.

The lower end of the mould cavity is closed by a base ring 182, Figs. 2B, 7, 8 and 12, whose top face is flush with the upper surface of the lower control ring 121. The base ring 182 has an inner circumference engaging the periphery of the lower control ring 121 and a plurality of inwardly extending lugs 183 which individually engage a corresponding number of notches 186 in the under surface of the lower control ring 121 in such manner that the base ring 182 is separable from below the lower control ring 121, but lifts the lower control ring when it is carried, as when the inner mould assembly is lifted from the outer mould. The base ring is suspended from the longitudinal reinforcing wires 15. The base ring 182 centers the lower control ring 121 with respect to the lower base plate 30 of the mould, and when the mould is in operation, the lower end dies 33 are brought into contact with the periphery of the base ring 182. The base ring 182 anchors the longitudinal wires 15 at the lower end of the mould and thus serves as the lower prestressing ring for the wires. It has a plurality of holes 187, in number and in position corresponding with the holes 169 in the upper prestressing ring 166. The short rods 190, having heads for retaining them, are individually inserted in the several holes 187, as best illustrated in Fig. 8. The upper ends of these rods are tapped for engaging the lower ends of the longitudinal reinforcing wires 15.

When the inner mould assembly is to one side of the outer mould, the upper ends of the several longitudinal reinforcing wires 15 are engaged by the rods 172 which suspend from the prestressing ring 166. The lower ends of the wires are engaged by the rods 190 which are seated in the base ring 182. Slack in the wires is removed by adjusting the nuts 176 at the upper ends of the rods 172. As thus assembled the wires 15 serve to hold the various elements of the inner mould assembly together for transport to the outer mould. The upper control ring 120 and the lower control ring 121 seat, respectively, against the upper and lower ends of the inner major and minor mould segments 122 and 123. Owing to the engagement of the lugs 183 of the base ring 182 with the lower control ring 121, the entire inner mould assembly can be suspended from the eyebolts 144. When the assembly is lowered within the outer mould, the base ring 182 guides the inner mould assembly and then centrally seats the lower end thereof with respect to the outer mould and the base plate 30.

The inner major and minor mould segments 122 and 123, respectively, are radially movable under hydraulic control for expanding and contracting the inner mould wall. Each of the segments extends from the upper control ring 120 to the lower control ring 121, and suitable sealing means and gaskets are provided, as required, for preventing the flow of water between the segments and between the ends of the segments and the control rings.

The inner major mould segments 122 are constructed similarly to the outer major segments 31 (Figs. 2A, 2B, 5 and 12). There are three inner major mould segments 122, each having an arcuate outer wall 193, an inner wall 194 and upper and lower walls 195 and 196, all of which are fastened together to form an enclosed steam chamber 197. The center of the inner wall 194 is curved and is flanked by flat marginal surfaces over which the inner minor mould segments 123 are slidable. A plurality of wall separators 198 are located intermediate the upper and lower walls 195 and 196 for stiffening the structure. These intermediate wall separators are perforated to permit access of steam to all parts of the enclosed chamber 197. The mould cavity side of the wall 193 has fastened to it a plurality of bars 201 with every other of the bars welded to the plate 193 and intermediate bars riveted thereto. The longitudinal edges of the bars are bevelled in order to provide a V-shaped channel between each pair of bars and the wall 193, the outer apex of the channel providing a water-permeable passage formed by a line contact between adjacent bars and which extends the full length of the mould wall. These channels are filled with sand or other suitable material for filtering the water entering the channels from the concrete in the mould cavity. The outer surfaces of the several bars 201 constitute the moulding surfaces of the inner major mould segments 122.

Access of steam to the interior of the inner major mould segments 122 is gained through a plurality of holes 205 in the lower end wall 196, which register with a similar number of holes 208 in the lower control ring 121 (Figs. 2B and 6). The lower end of each hole leads to a circular channel 211 in the surface of the base plate 30 and steam is conducted to this recess through conduit 212. There is one circular channel 211 and one steam conduit 212 for each of the inner major mould segments 122. The steam mains 215 supply steam to the conduits 69 and 212.

There are three inner minor mould segments 123 (Figs. 5 and 12), each being located intermediate adjacent inner major mould segments 122. These may be constructed from a solid bar having a triangular cross-section having sloping surfaces 218 and 219 engageable with the flat marginal surface areas of the inner wall 194 of the adjacent inner major mould segments and adapted to slide with respect thereto. These surfaces 218 and 219 are grooved to provide gasket-receiving recesses at opposite edges of a relatively narrow moulding surface 222, which is of such width as to fill the space between the longitudinal edges of the inner major mould segments when the inner mould is fully expanded, as illustrated in Fig. 5. The gaskets 223 and 224 seal the longitudinal meeting edges of the major and minor mould segments.

The positions of all of the inner mould segments 122 and 123 during a moulding operation are determined by the positions of the cam members 133 and 134 axially of their respective shafts 125 and 129, Fig. 12. Both of the cam members are restricted to axial movement and are simultaneously translated by opposed threads 226 and 227 on the shafts 125 and 129, respectively. Each of the cam members has six cam surfaces, three cam surfaces 228 for controlling the movement of the inner major mould segments 122, and three cam surfaces 229 for controlling the movement of the inner minor mould segments 123. The cam surfaces 228 have less slope than the cam surfaces 229 because the major mould segments 122 are moved radially of the mould at a slower rate than the minor mould segments 123.

Each of the inner major mould segments 122 has a cam follower 230 permanently attached to it by a lug 231 which is welded within a notch in the lower wall 196 of the inner major mould segment, and each of the inner minor mould segments 123 has a cam follower 232 with a lug 233 which is similarly attached to its lower end. Each follower 230 has a sloping surface 234 corresponding to the cam surface 228, and each follower 232 has a sloping surface 235 corresponding to the cam surface 229. The cam followers 237 and 238 attached to the upper ends of the inner major and minor mould segments, respectively, and cooperating with the cam 133, are constructed and function similarly to the cam followers 230 and 232, respectively, and control the movement of the upper ends of the major and minor inner mould segments. The lower cam followers 230 and 232 are slidingly mounted in radial recesses in the lower control ring 121, and the cam followers 237 and 238, attached to the upper ends of the inner mould segments, are similarly mounted for sliding in radial recesses in the upper control ring 120. The inner mould segments are held in any desired position within a range of radial travel by hydraulic pressure in the bores 239 in the lower control ring and in the bores 241 in the upper control ring 120. The pressure developed in the bores holds the cam followers 230, 232, 237 and 238 in contact with their respective cam members 133 and 134. Because of the similarity of the upper and lower cam members, and their coordinated positions along the axis of the mould, all of the inner mould segments are always parallel or symmetrically located with reference to the axis of the mould. When the central column shaft 126 is rotated in either direction under control of the torque motor 132, the cam members 133 and 134 are moved in opposite directions to move or position the inner mould segments either inwardly or outwardly, depending upon the direction of rotation of the central column shaft 126.

Hydraulic pressure in the bores 239 and 241 is employed to collapse the inner mould and to strip the inner mould from the interior surface of a moulded pipe following a moulding operation. Before this is accomplished, the cam members 133 and 134 are moved axially toward each other by rotating the torque motor and the shaft 126. This action permits the cam followers 230, 232, 237 and 238 to follow-up against the withdrawing movement of the cam members, so that the inner mould segments can be retracted by pressure in the bores 239 and 241. The pressure developed in bores 239 and 241 acts on the pistons 240 and 242. There is one bore 239 and one piston 240 in the lower control ring 121 for each of the six cam followers 239 and 232, and similar bores 241 and pistons 242 in the upper control ring 120 for each of the six cam followers 237 and 238. The several bores 239 and 241 are closed at their outer ends by screw plugs 243 and 244.

Each of the six bores in the lower control ring 121 is connected by a conduit 245 (Fig. 2B) with a pressure distributing conduit ring 246 and a common conduit 247. A disengageable coupling 248 connects the conduit 247 with the main pressure supply line 249. Likewise, each of the six bores 241 in the upper control ring 120 is connected by a conduit 250 with a pressure distributing conduit ring 251 and a common conduit 252 (Figs. 2A and 3), which is connectible with a coupling to a main pressure supply line 253. The supply lines 249 and 253 are preferably supplied and controlled from a common source of pressure. When the cam members 133 and 134 move towards each other the pressure in the bores 239 and 241 simultaneously move all of the inner mould segments inwardly.

The maximum obtainable compressing force exertable by the inner mould segments is produced by hydraulic pressure developed within an extensible bag or diaphragm 256 of rubber or rubber-like material similar to the material of which the extensible bags 97 are made (Fig. 12). This diaphragm 256 is disposed between the inner mould segments and the shaft 126 and normally is in contact with the inner surfaces of all of the inner mould segments. It is tubular-shaped and has skirts 257 and 258 at its ends which are secured in sealing engagement with the outer ends of tubes 259 and 260, respectively. The skirt 257 is fastened in sealing relationship to the flange of the tube 259 by a ring 261 firmly secured in place by screws 262 at the lower end of the mould. The skirt 258 is similarly sealed at its upper end between the tube 260 and a ring 263. The tubes 259 and 260 are in sealing engagement with the cam members 134 and 133, respectively, and their inner ends 264 and 265 are in bearing relationship with the ends of the central shaft 126, so that the shaft may be rotated in respect thereto.

The shafts 125 and 129 are drilled to provide passageways 266 and 267 connecting, respectively, with passage 268 in the upper conntrol ring 120 (Fig. 12), and a self-sealing disconnect coupling 269 at the lower end of the mould (Fig. 2B). The passage 268 is connected by means of a conduit 271 to a source of pressure supply, and the self-sealing disconnect coupling 269 is likewise connected by a conduit 274 and a coupling 275 to a pressure supply line 276. Liquid can be introduced to or exhausted from the extensible diaphragm 256 through either the shaft 125 or the shaft 129 to vary the pressure within the extensible diaphragm 256, as desired. Water or any suitable oil or non-compressible liquid may be used.

The flow of liquid between the passage 267 in the shaft 129 and the interior of the diaphragm 256 is accomplished through holes 277, chamber 278 and ports 279 in the tube 259. The flow of liquid between the passage 266 in the shaft 125 and the interior of the diaphragm 256 is attained through holes 280, chamber 281 and ports 282 in the tube 260. Gaskets 283 and 284 in annular grooves in the sliding surfaces of the cam member 133 prevent loss of pressure along the sliding surfaces, and similar gaskets and grooves are provided in the sliding surfaces of cam member 134 for preventing leakage of liquid along the sliding surfaces of cam member 134. It is to be understood that adequate provisions are made for sealing against the leakage of fluid at all bearing surfaces within the mould.

During a dehydrating process, the excess water is squeezed from the concrete, and, as has been explained hereinabove, the water squeezed from the exterior surface of the concrete enters the V-shaped filtering channels in the outer major mould segments 31 and is collected after passing through the ports 77 in the mould supporting base 30, Figs. 6, 12 and 2B. The water which exudes from the inner surface of the concrete passes through the filtering channels in the inner major mould segments 122 and descends to an annular recess 290 in the upper surface of the removable base ring 182, Fig. 6. The annular recess 290 is interrupted under each of the inner minor mould segments 123 by rubber seals 291, 292 and 293 seated in recesses in the upper surface of the base ring 182. These seals 291, 292 and 293 prevent the flow of water along the lower ends of the inner minor mould segments. The base ring has a plurality of holes 294 (Fig. 12) which drain the water into an annular channel 295 from which the water is withdrawn through ports 296 in the mould supporting base 30, Figs. 8 and 12.

In forming concrete pipes in accordance with the method carried out by the apparatus of the present invention, it is important to determine beforehand the exact amount of concrete mix which is to be used for making a single pipe and the quantities of the different ingredients of the concrete. By experience it is known what quantity of water will be squeezed out of a given quantity of concrete subjected to a given pressure, and it is therefore important to collect and measure all of the water which is exhausted through the ports 77 and 296.

It is apparent that the individual quadrants of the dies 33 and 34 can be formed in one piece having moulding surfaces shaped to form the particular end surfaces desired for the outside of a moulded body, or that each quadrant may be an assembly of several pieces. The construction of a die consisting of two pieces is illustrated in Fig. 8. The moulding portion 297 is preferably made of porous metal, such as "Oilite." This is a relatively expensive material, and as the die quadrants are relatively large, they may be fabricated from a number of plates in a manner such as is illustrated in Fig. 11, for example, in which the outer part of each die quadrant is an assembly of a curved plate 299, a plurality of superposed steel members 300, 301, 302, and segments 303 and 304 of porous metal. The several members are welded or riveted together. The segments of porous metal are insertible and removable from recesses in which they are held by bolts or rivets 305.

Fig. 18 illustrates an outer major mould segment 310 which extends to the end of the mould cavity for forming a straight-walled moulded body with a plain end. The die 330 is modified to cooperate with the mould segments, but the other parts remain as shown in Fig. 10.

*Operation*

Assuming that the inner mould assembly has been prepared with the longitudinal reinforcing wires 15 and the circumferential reinforcing wires 16 in place and the inner mould assembly is tied down, within the outer mould, and the pressure lines have been connected, as illustrated in Figs. 2A, 2B and 12, the mould is ready for pouring. Pressure is applied to the several cylinders 93 and the lower and upper dies 33 and 34 are moved to their most inward positions. The dies are held against the shoulders 44 and 48 of the base plate 30 and top plate 46 by substantial pressure. The positioning of the dies also effects inward movement and initial positioning of the outer major and minor mould segments 31 and 32 (Fig. 13).

The inner major and minor mould segments 122 and 123 are centralized with the cam followers 230 and 232 bearing on the cam member 134 and the cam followers 237 and 238 bearing on the cam member 133, by virtue of effective pressure on the pistons 240 and 242. The torque motor 132 is operated to rotate the central column of shafts 125, 126 and 129 and to move the cam members 133 and 134 in opposite directions to predetermined positions for locating the inner major and minor mould segments 122 and 123 in correct positions for pouring. The positions of the cam members 133 and 134 and of the inner mould segments can be determined by a revolution counter driven by the shaft 129. The operator stops the revolution of the central shaft column and the movements of the cam members to so position the inner mould segments to have the mould cavity accommodate the gross quantity of concrete desired to be used in making a particular pipe. When the torque motor is stopped it is pressure-locked to hold the cam members in the desired positions. A relatively low pressure, say, of 10 pounds per square inch, may then be applied in the bags or diaphragms 97 to firm the bags. The relationship of the movable mould parts at this stage is diagrammatically illustrated in Fig. 13.

Collective equipment for receiving and measuring the water exuded from the concrete during dehydration is positioned below the discharge ports 77 and 296 at the lower end of the mould. The exact gross quantity of concrete required is poured and evenly distributed into the pouring hopper 168 at the top of the mould and the tamping cylinder 149 is operated to reciprocate the tamping ring 167 and force the concrete into the mouth of the mould. If desired, the inside mould may be actuated or vibrated to aid in the elimination of air. The concrete may be vibrated by flexible shaft vibrators of the internal type extending therein. During pouring the outer major and minor mould segments 31 and 32 are held immovable by the end dies 33 and 34 which are maintained in their innermost positions by the straightened sets of toggle links 88 and 89 and pressure in the cylinders 93. The outer major mould segments 31 are either not pressurized or are slightly pressurized by low pressure in the bags 97. The inner major and minor mould segments 122 and 123 are held firm by the cam members 133 and 134.

When the gross quantity of concrete has been forced into the mould cavity, the tamping ring 167 is loaded under high pressure with the tamping ring seated against the moulding inserts 42 of the upper end dies 34 to seal the mouth of the mould (Figs. 2A and 12).

During dehydration of the concrete, the pressure in the four bags 97 and in the bag 256 is increased gradually to, say, 300 pounds per square inch. This causes all of the outer major mould segments 31 to press and move inwardly and all of the inner major and minor mould segments 122 and 123 to press and move outwardly to compress the concrete within the mould cavity, as diagrammatically illustrated in Fig. 14. As the inner mould segments move outwardly the cam members 133 and 134 are moved towards the ends of the mould and maintain control on the movement of the inner mould segments. The excess water contained in the concrete is exuded through the forming walls of the outer and inner major mould segments 31 and 122 into the filtering channels and is collected in the collecting equipment located below the mould. Steam may be introduced into the outer and inner major mould segments 31 and 122 to start bringing the moulds to heat, if preliminary warming is desired.

The circumferential reinforcing is tensioned by the hollow body of confined concrete by moving the inner and outer mould walls outwardly as the concrete is curing (Fig. 15). To expand and further compress the hollow body of concrete, the pressure within the bag or diaphragm 256 is gradually built up beyond 300 pounds per square inch to a maximum pressure such as, for example, 1500 pounds per square inch, while the pressure in the four bags or diaphragms 97 is maintained at a lesser pressure, say, 300 pounds per square inch. The outer major mould segments 31 and the inner major and minor mould segments 122 and 123 are thereby gradually moved outwardly while their movement is controlled by the cam members 133 and 134 and their followers 230, 232, 237 and 238. The maximum permissible outward movement of the outer major mould segments 31 is determined by the stationary lower and upper end dies 33 and 34 which are held in locked positions by the toggle links and the pressurized cylinders 93.

When the ultimate moulding positions of the inner and outer walls of the mould have been attained, tension is applied to the longitudinal wires 15 by adjusting the nuts 176 on the rods 172. As the wires are tensioned before the concrete has cured, the wall of the hollow concrete body will be held in a state of permanent compression when the body is removed from the mould.

Steam is applied to the interiors of the outer and inner major mould segments to accelerate the curing process. The application of steam is continued until the concrete has sufficiently cured.

When the concrete has cured, the torque motor 132 is operated to retract the cam members 133 and 134, and the pressures in the bags 97 and in the diaphragm 256 are released. The pressure which is still effective upon the upper and lower cam pistons 240 and 242 causes the pistons to advance their respective cam followers 230, 232, 237 and 238 and collapse the inner major and minor mould segments as the supporting surfaces of the cam members 133 and 134 recede. The inner major and minor mould segments are thereby broken away from the inside surface of the concrete body (Fig. 16).

The lower and upper end dies 33 and 34 are then operated by their actuating cylinders 93 and moved outwardly to retract the end dies from contacting relationship with the concrete body. As the end dies move outwardly they pick up and carry with them the outside major mould segments 31 and break them away from contacting relationship with the exterior of the concrete body. The outward movement of the outer major mould segments 31 relieves the outer minor mould segments 32 from their pressure-retaining positions against the outside surface of the concrete body. The relationship of the mould segments and of the upper and lower end dies is diagrammatically illustrated in Fig. 16. The tamping ring 167 by which the upper end of the mould cavity was closed is raised by the tamping cylinder 149.

There remains only to remove the moulded concrete body. The various hydraulic pressure fittings are disconnected, loss of fluid from the pressure lines being prevented through the several self-sealing disconnect couplings at the points of disconnect. The lines 145 by which the inner mould assembly is tied down into place are released, and the inner mould assembly and the concrete body may then be raised from the outer mould by cables attached to the eyebolts 144, and moved to one side and placed upon a support frame.

With the removable base ring 182 clamped to a support frame and all of the rods 172 detached from the upper ends of the longitudinal reinforcing wires 15, the inside mould assembly, with the exception of the removable base ring 182, is lifted and withdrawn from the concrete body. The removable base ring 182 is removed from the pipe after all of the rods 190 have been disconnected from the lower ends of the longitudinal reinforcing wires 15.

After freeing the inner mould assembly from the moulded concrete body, the assembly can be cleaned and rewired. A second removable base ring may be employed, if necessary. The inner mould assembly is then ready for reuse and insertion within the outer mould.

The principle of operation of the invention and the apparatus which is now considered to represent the best embodiment thereof, have been described, but it is desired that it be understood that the apparatus disclosed is only illustrative, and that the invention can be carried out by other means. Any suitable fluid pressure system may be employed for operating the apparatus. While a hydraulic system is preferred and has been described herein, a system utilizing an elastic medium may be employed, if desired, to operate the various pistons, motors and diaphragms.

While the apparatus illustrated in the drawings is designed to use the various features and elements in the combinations and relationship shown, some of these may be altered and others omitted without interfering with the more general results outlined and the utility of the invention within the scope of the appended claims.

What is claimed is:

1. In a moulding apparatus, the combination comprising a deformable outer mould wall, a deformable inner mould wall, said inner and outer mould wall defining a mould cavity therebetween, each of said mould walls being formed by individual segments arranged circumferentially of the mould and having longitudinal edges of adjacent segments of the respective walls in sealed relationship with each other and providing a circumferentially continuous mould wall irrespective of the adjusted distance between said walls, means for holding said mould walls for forming a mould cavity of a predetermined volume therebetween, and means for moving all of said segments for changing the distance between said mould walls.

2. In a moulding apparatus, the combination comprising an inner deformable mould wall, an outer deformable mould wall spaced from said inner mould wall and forming a mould cavity therebetween, each of said mould walls being formed by juxtaposed segments, adjacent segments of each mould wall having constantly engaging longitudinal edges with the adjacent segments in the respective walls slidable with respect to each other upon change in the circumferential girth of the mould wall, means for locating said inner and outer mould walls in spacial relationship, and means operable independently of said last-named means for displacing said segments of said inner mould wall outwardly.

3. In a moulding apparatus, the combination comprising an inner deformable mould wall, an outer deformable mould wall spaced from said inner mould wall and forming a mould cavity therebetween, each of said mould walls being formed by juxtaposed segments, the adjacent segments of each mould wall having constantly engaging longtudinal edges with the segments providing a circumferentially continuous mould wall irrespective of the adjusted position of the mould wall, means for holding said inner and outer mould walls in spacial relationship, and means for displacing said segments of said outer mould wall outwardly and said segments of said inner mould wall inwardly to expand the mould cavity.

4. In a moulding apparatus, the combination comprising an inner deformable mould wall, an outer deformable mould wall spaced from said inner mould wall and forming a mould cavity therebetween, each of said mould walls being formed by juxtaposed segments, the adjacent segments of each mould wall having constantly engaging longitudinal edges with the segments providing a circumferentially continuous mould wall irrespective of the adjusted position of the mould wall, means for holding said inner and outer mould walls in spacial relationship, and pressure-operated means for moving alternate segments of said outer mould segments toward said inner mould wall to reduce their spatial relationship from oppositely located inner mould segments for applying pressure on material contained between said inner and outer mould walls.

5. In a moulding apparatus, the combination comprising a contractible outer mould wall, an expansible inner mould wall, said outer and inner mould walls defining a mould cavity therebetween, each of said mould walls being formed by individual segments arranged circumferentially of the mould, the adjacent segments of each mould wall having constantly engaging longitudinal edges with the segments providing a circumferentially continuous mould wall irrespective of the adjusted position of the mould wall, means for holding said mould walls for forming a mould cavity of a predetermined volume therebetween, and means for expanding said inner mould wall, said last-named means including a distensible diaphragm surrounded by said inner mould wall segments.

6. In a moulding apparatus, the combination comprising a contractible outer mould wall, an expansible inner mould wall, each of said mould walls including segments arranged edge to edge to complete their respective mould walls, the edges of adjacent segments of the respective walls constantly engaging and providing a circumferentially continuous mould wall irrespective of the adjusted distance between the walls, means for locking the segments of said outer wall against outward movement from location inside the possible maximum perimeter of said outer mould wall, means for locking the segments of said inner wall against inward movement from location outside the possible minimum perimeter of said inner mould wall, means for applying pressure inwardly against alternate segments of said outer mould wall for moving said alternate segments inwardly, and means for applying pressure outwardly against said inner mould segments for moving said inner mould segments outwardly.

7. In a moulding apparatus, the combination comprising a contractible outer mould wall comprising a plurality of segments arranged edge to edge and defining an outer mould wall, means for guiding said segments towards and away from the center of the moulding apparatus, an expansible inner mould wall comprising a plurality of segments arranged edge to edge and defining an inner mould wall, the inner mould wall segments having constantly contacting slidable surfaces enabling the segments to define an inner mould wall capable of varying girth without separation of the segments, means for moving said outer mould segments and said inner mould segments towards and away from each other for varying the cross-section of the mould cavity between the outer and inner walls of the mould, and means separate and distinct from said last-named means for additionally moving said segments for compressing material therebetween.

8. In a moulding apparatus, the combination comprising an outer mould wall including segments supported for movement towards and away from the center of the mould, and an inner mould wall including segments arranged edge to edge and supported for movement towards and away from the center of the mould, means for moving said segments for locating the outer and inner mould walls at predetermined distances from each other for forming a mould cavity between the walls, and means separate and distinct from said last-named means for applying pressure on every other of said outer mould wall segments and on said inner mould wall segments for moving said segments for compressing material contained within the mould cavity.

9. In a moulding apparatus, the combination comprising a contractible outer mould wall comprising a plurality of segments arranged for defining an outer mould wall, means acting simultaneously at both ends of all of said segments for moving them inwardly from outward positions, an expansible inner mould wall comprising a plurality of segments arranged edge to edge and defining an inner mould wall, means acting simultaneously at both ends of all of said inner mould segments for locating the inner mould segments symmetrically with respect to the outer mould segments, pressure-controlled means disposed intermediate the ends of said outer mould segments and operable independently of said first-named means for moving alternate ones of said outer mould segments inwardly, pressure-controlled means disposed intermediate the ends of said inner mould segments and operable independently of said second-named means for moving said inner mould segments outwardly, and means for withdrawing said outer and inner mould segments away from a body moulded therebetween.

10. In a moulding apparatus, the combination comprising radially displaceable outer and inner mould walls, each of said mould walls including segments arranged in series to form outer and inner mould walls, respectively, said walls being spaced to provide a mould cavity, exterior surface-forming dies located at the upper and lower ends of the outer mould segments and having means for contacting the ends of said outer mould segments for positioning the same, cam members located inward of said inner mould wall, cam followers carried by said inner mould segments, and means for simultaneously operating said cam members for adjusting the location of said inner mould segments with respect to said outer mould wall.

11. In a moulding apparatus, the combination comprising radially displaceable outer and inner mould walls, each of said mould walls including segments arranged in series to form outer and inner mould walls, respectively, exterior surface-forming dies at the upper and lower ends of the outer mould segments and having means for contacting the ends of said outer mould segments for positioning the same, means for moving said dies towards and from the center of the mould, cam members for locating the positions of said inner mould segments, cam followers carried by said inner mould segments, and pressure operable means for holding said cam followers in contact with said cam members.

12. In a moulding apparatus, the combination comprising an outer mould wall including segments arranged side by side and mounted for movement towards and away from the center of the mould, an inner mould wall including segments arranged side by side and mounted for movement towards and away from the center of the mould, each of said inner mould segments extending for the full length of the mould and each of said outer mould segments extending for substantially the full length of the mould, external surface-forming dies located at the ends of said outer mould segments, means carried by said external surface-forming dies for locating said outer mould segments in predetermined positions, means for moving said external surface-forming dies radially of the mould, means for locating said inner mould segments in predetermined positions, means for applying inward pressure on said outer mould segments, and means for applying outward pressure on said inner mould segments for compacting material between said outer and inner mould walls.

13. In a moulding apparatus, the combination comprising radially displaceable outer and inner mould walls, each of said mould walls including segments arranged in series to form an outer and inner mould walls, respectively, the adjacent segments of each mould wall having constantly engaging longitudinal edges with the segments providing a circumferentially continuous wall irrespective of the adjusted position of the wall, means for positively locating said segments of said outer mould wall against outward movement, means for positively locating said segments of said inner mould wall against inward movement and at a desired distance from and symmetrical to the segments of said outer mould wall during a mould-filling operation, fluid pressure controlled means for advancing outer and inner mould segments towards each other for compressing material therebetween and for expanding the inner and outer mould walls to expand the cross-sectional area of the compressed material therebetween.

14. In a moulding apparatus, the combination comprising an outer mould wall consisting of individual segments arranged side by side and mounted for movement towards and away from the center of the mould, some of said segments having porous channels in the moulding surfaces thereof for receiving water, an inner mould wall consisting of individual segments arranged side by side and mounted for movement towards and away from the center of the mould, some of said inner mould wall segments having porous channels in their moulding walls for receiving water from material between the outer and inner mould walls, means for positioning said outer mould segments, means for positioning said inner mould wall segments with respect to the outer mould wall segments to form a mould cavity, means for draining water from said porous channels, means for receiving pressurized fluid for exerting pressure on said outer mould-forming segments and against material contained within the mould cavity, and means for receiving pressurized fluid for exerting pressure on said inner mould segments and against the material contained within said mould cavity.

15. In a moulding apparatus, the combination comprising radially displaceable outer and inner mould walls, each of said mould walls including a plurality of individual segments arranged in series to form outer and inner mould walls, respectively, the segments of said outer mould wall and of said inner mould wall comprising segments having surface-forming walls alternately disposed with segments having pressure-retaining walls, said surface-forming wall segments having porous channels for extracting water from material between the walls, guide means limiting said segments to radial movement for changing the spacing between said outer and inner mould walls, means for locating said mould walls at desired distances from each other for forming a mould cavity, and means for displacing the individual segments of each of said outer and inner mould walls radially for changing the cross-sectional area of the mould cavity.

16. In a moulding apparatus, the combination comprising an outer mould wall including a plurality of individual segments arranged side by side and mounted for movement towards and away from the center of the mould, said segments including segments having relatively broad moulding surfaces and segments having relatively narrow moulding surfaces arranged alternately with respect to each other, an inner mould wall including a plurality of individual segments arranged side by side and mounted for movement towards and away from the center of the mould, said inner mould wall segments including segments having relatively broad moulding surfaces and segments having relatively narrow moulding surfaces alternately arranged with respect to each other, all of said segments with relatively broad moulding surfaces having porous channels in their moulding surfaces for extracting water from material between the outer and inner mould walls and all of said segments with relatively broad moulding surfaces having chambers for receiving steam therein, means for positioning said outer mould wall and said inner mould wall with respect to each other to form a mould cavity therebetween, means for conducting steam to said chambers, means for draining water from said porous channels, distensible diaphragms for receiving pressurized fluid for exerting pressure on said outer mould segments and against material contained within the mould cavity, and a distensible diaphragm for receiving pressurized fluid for exerting pressure on said inner mould segments and against material contained within said mould cavity.

17. In a moulding apparatus, the combination comprising an outer mould wall including segments arranged side by side and mounted for movement towards and away from the center of the mould, said segments including segments having relatively broad moulding surfaces and segments having relatively narrow moulding surfaces arranged alternately with respect to each other, an inner mould wall including segments arranged side by side and mounted for movement towards and away from the center of the mould, said inner mould wall segments including segments having relatively broad moulding surfaces and segments having relatively narrow moulding surfaces alternately arranged with respect to each other, external surface-forming dies located at the ends of said outer mould segments and engageable therewith for positioning said outer mould wall, means engageable with said inner mould wall segments for positioning said inner mould wall segments with respect to the outer mould wall segments to form a mould cavity, distensible diaphragms for receiving pressurized fluid for exerting pressure on said outer mould-forming segments and against material contained within the mould cavity, and a distensible diaphragm for receiving pressurized fluid for exerting pressure on said inner mould segments and against the concrete contained within said mould cavity.

18. In a moulding apparatus, the combination with an outer mould wall of an inner mould assembly removable from said outer mould wall, said inner mould assembly including segments arranged side by side and mounted for movement towards and away from the center of the mould, an end member contiguous the upper ends of said segments, a second end member contiguous the lower ends of said segments, a central shaft rotatably supported in said upper and lower end members, cam members mounted on said shaft, said cam members being translatable along the axis of the shaft upon rotation of the shaft, cam followers carried by said segments and engageable with said cam members, pressure operable cylinders for applying said cam followers against said cam members to hold said segments in positions determined by said cam members, and a means for supporting said inner mould assembly in said moulding apparatus.

19. In a moulding apparatus, the combination with an outer mould wall of an inner mould assembly removable from said outer mould wall, said inner mould assembly including segments arranged side by side and mounted for movement towards and away from the center of the mould, an upper control ring adjacent the upper ends of said segments, a lower control ring adjacent the lower ends of said segments, a shaft rotatably supported by said upper and lower control rings, cam members mounted on said shaft, said cam members being translatable along the axis of the shaft upon rotation of the shaft, cam followers carried by said segments and engageable with said cam members, pressure operable cylinders for applying said cam followers against said cam members, said cylinders being mounted in said upper and lower control rings, a distensible diaphragm intermediate said shaft and said segments, passageways in said shaft for introducing fluid between said shaft and said distensible diaphragm, and means for supporting said inner mould assembly in said moulding apparatus.

20. In a moulding apparatus, the combination with an outer mould wall of an inner mould assembly removable from said outer mould wall, said inner mould assembly including segments arranged side by side and mounted for movement towards and away from the center of the mould, an end member adjacent the upper ends of said segments, a second end member adjacent the lower ends of said segments, a shaft rotatably supported by said upper and lower end members, means controlled by said shaft for locating the inward positions of said segments, a distensible diaphragm intermediate said shaft and said segments, passageways in said shaft for introducing fluid to act upon said distensible diaphragm, a wire-prestressing ring engaging said lower end member, a wire-prestressing ring supported by said upper end member, and means for supporting said inner mould assembly in said moulding apparatus.

21. In a moulding apparatus, the combination with an inner mould wall of an outer mould wall enclosing a mould cavity outside of said inner wall, said outer wall consisting of juxtaposed segments movable towards and away from the center of the mould, dies for moulding a portion of at least one end of the material to be moulded within the mould cavity, said dies being supported at one end of the mould cavity opposite said inner mould wall and slidable towards and away from said inner mould wall, and means to hold said dies and segments in a predetermined position with respect to said inner mould wall.

22. The combination set forth in claim 21 in which said dies have moulding surfaces of porous material.

23. The combination set forth in claim 21 in which the moulding surfaces of the dies have profiles for moulding a joint surface on the exterior of the material to be moulded.

24. In a moulding apparatus, the combination comprising an outer deformable mould wall comprising a plurality of segments extending longitudinally of the moulding apparatus, means for moving said outer mould wall segments laterally to define an outer mould wall of desired circumference, said means including radially movable and positionable blocks for engaging the ends of said outer mould segments, means limiting the radially inward movement of said blocks and of said outer mould wall segments, an inner mould wall comprising a plurality of longitudinally extending segments providing a mould wall movable laterally with respect to said outer mould wall, and means for locating said inner mould wall spaced from and concentric to said outer mould wall, said last-named means including cam members located at the axis of said inner mould wall and adjacent the ends of said inner mould segments, said cam means being operable on cam followers attached to said inner mould segments.

25. The combination set forth in claim 24 including pressurized means operable on said cam followers for moving said inner mould segments inwardly for breaking them away from material previously moulded between said inner and outer mould walls.

26. The combination set forth in claim 24 including elements carried by outer mould segments and engageable by said radially movable blocks when said blocks are moved radially outward from said outer mould segments to break said outer wall segments away from material previously moulded between said mould walls.

References Cited in the file of this patent

UNITED STATES PATENTS

| | | |
|---|---|---|
| 936,861 | Brown | Oct. 12, 1909 |
| 965,002 | Pauly | July 19, 1910 |
| 1,086,121 | Atterbury | Feb. 3, 1914 |
| 1,554,585 | Lake | Sept. 22, 1925 |
| 2,048,253 | Freyssinet | July 21, 1936 |
| 2,170,188 | Cobi | Aug. 22, 1939 |
| 2,359,471 | Ewing | Oct. 3, 1944 |
| 2,502,789 | James | Apr. 4, 1950 |
| 2,628,402 | Billner | Feb. 17, 1953 |